United States Patent

Naraki et al.

Patent Number: 5,733,217
Date of Patent: Mar. 31, 1998

[54] CENTRIFUGAL FRICTION CLUTCH FOR AUTOMATIC SPEED CHANGING DEVICE

[75] Inventors: Tetsuo Naraki; Eiichiro Kawahara, both of Wako, Japan

[73] Assignee: Honda Giken Kogyo Kabushiki Kaisha, Wako, Japan

[21] Appl. No.: 668,933

[22] Filed: Jun. 24, 1996

[30] Foreign Application Priority Data

Jun. 30, 1995 [JP] Japan .................. 7-188075

[51] Int. Cl.$^6$ ............... F16H 1/28; F16H 61/00; F16D 43/06
[52] U.S. Cl. ............ 475/258; 192/52.4; 192/105 C; 192/103 A
[58] Field of Search ............ 192/105 R, 105 B, 192/105 C, 105 A, 52.1, 52.4; 475/258, 260, 262

[56] References Cited

U.S. PATENT DOCUMENTS

| | | | |
|---|---|---|---|
| 2,111,722 | 3/1938 | Padgett | 192/105 C |
| 2,224,440 | 12/1940 | Lewis | 192/105 C X |
| 5,263,906 | 11/1993 | Antonov | 475/262 X |
| 5,409,428 | 4/1995 | Antonov | 192/105 C X |
| 5,423,406 | 6/1995 | Antonov | 192/103 A |

FOREIGN PATENT DOCUMENTS 6-505082  6/1994  Japan .

*Primary Examiner*—Richard M. Lorence
*Attorney, Agent, or Firm*—Nikaido, Marmelstein, Murray & Oram LLP

[57] ABSTRACT

An centrifugal friction clutch for an automatic speed changing device to changeover speed change stage automatically in accordance with a change of rotational speed is provided. The centrifugal friction clutch has a tubular output shaft 2 fitted on a boss section 3 fixed to an end of an input shaft 1 rotatably through a roller bearing 4; a sun gear 5 fitted on a periphery of the output shaft 2 rotatably relative thereto; a disk section 8 of a ring gear 6 integrally fitted to the input shaft 1 at the neighborhood of the boss section 3; three or four pieces of planetary gears 7 arranged at regular intervals on the outer periphery of the sun gear 5 and meshed with the sun gear 5 and the ring gear 6; a planetary carrier 9 integrally connected with the tubular output shaft 2; shafts 10 fitted to the planetary carrier 9 and rotatably supporting the planetary gears 7 through needle bearings 11; lighter centrifugal weights 23 and heavier centrifugal weights 24 fitted in cutouts 22 alternately and having base portions 23a, 24b engaged with a ring-shaped receiving piece 20; and a taper section 21 formed on an inner surface of an outer periphery of an outer side plate section 14b.

2 Claims, 8 Drawing Sheets

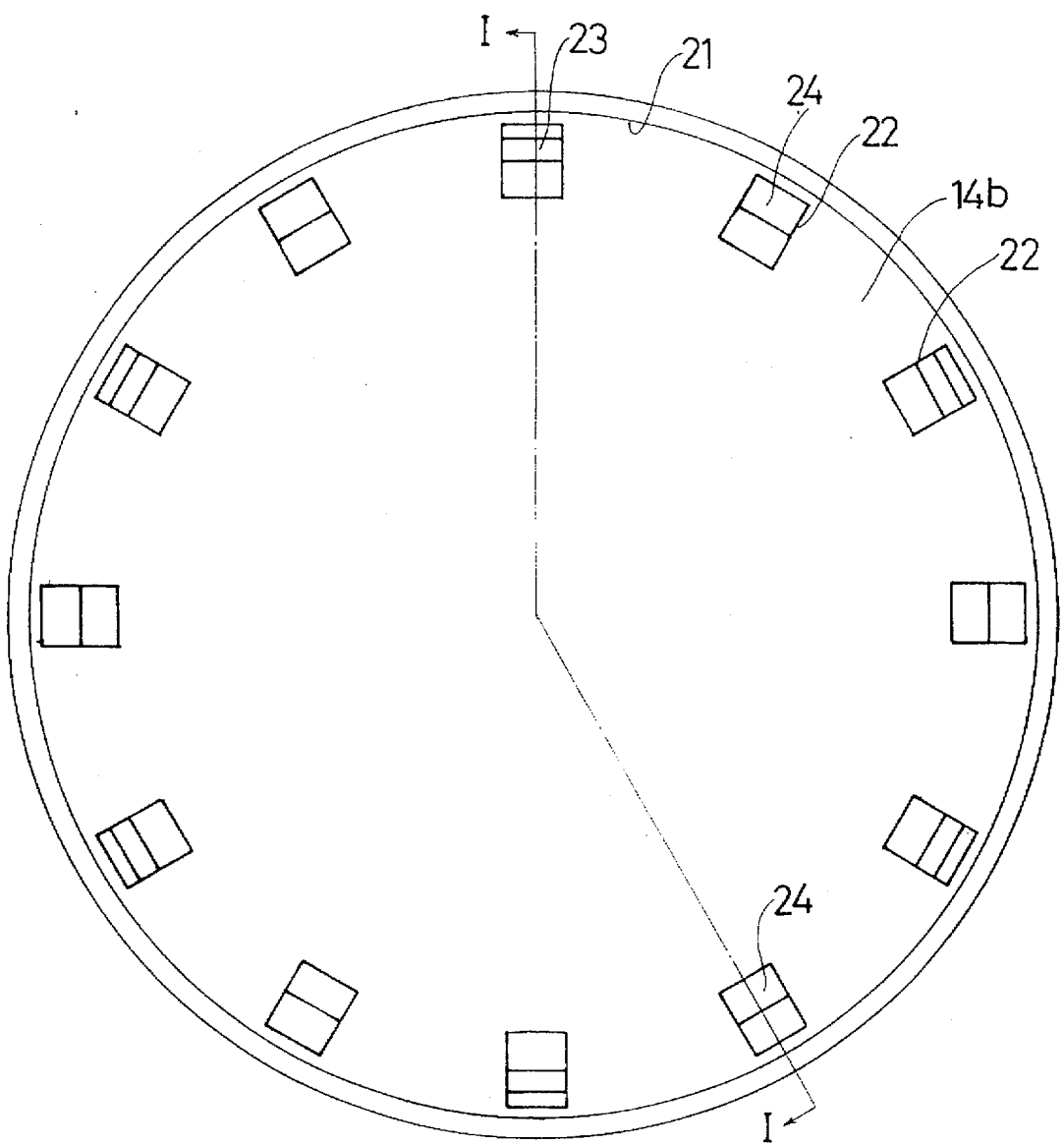
F I G. 4

1

CENTRIFUGAL FRICTION CLUTCH FOR AUTOMATIC SPEED CHANGING DEVICE

BACKGROUND OF THE INVENTION

This invention relates to as centrifugal friction clutch for an automatic speed changing device to changeover speed change stages automatically in accordance with a change of rotational speed.

Japanese Patent National Publication of the translated version No. HEI 6-505082 corresponding to PCT/FR91/ 00684 discloses an automatic speed changing device in which any one gear element of a sun gear, a ring gear and a planetary gear carrier forming a planetary gear reduction device is connected to an input shaft, either of remaining two gear elements is connected to an output shaft, and the other gear element of the remaining two gear elements is fixed. Between the gear element connected to the input shaft and the gear element connected to the output shaft is interposed a centrifugal multi plates friction clutch through a plate spring. When rotational speed of the input shaft is low, the input shaft and the output shaft are not brought into a directly connected state because centrifugal force acting on a centrifugal weight is weak and speed of the output shaft is reduced at a predetermined reduction ratio by a reduction mechanism. As the rotational speed of the input shaft increases the centrifugal force acting on the centrifugal weight gradually increases, and the centrifugal multi plates friction clutch comes into a connected state after being in half-clutch state to directly connect the output shaft to the input shaft.

In the above-mentioned centrifugal multi plates friction clutch, the centrifugal force F acting on the centrifugal weight increases and decreases in proportion to the square of the rotational speed N. Accordingly, if the mass $M_1$ of the centrifugal weight is small, the transmitted torque T of the centrifugal multi plates clutch is low level in a region of low rotational speed N as shown in FIG. 7, and a rapid shift-up of the automatic speed changing device hardly can be performed.

Contrary, if the mass $M_2$ of the centrifugal weight is large, the clutch transmitted torque T becomes too high in a region of high rotational speed N, and it is difficult to perform a smooth shift-down.

SUMMARY OF THE INVENTION

This invention relates to an improvement of a centrifugal friction clutch for an automatic speed changing device overcoming such problems described as above and provides a centrifugal clutch for an automatic speed changing device having an abutting section of an input member and an output member on which centrifugal force acting on a centrifugal weight is applied through an elastic member to detachably engage the input member with the output member in accordance with magnitude of the centrifugal force, characterized in that the device has a plurality of the centrifugal weights and an appointed centrifugal weight among a plurality of the centrifugal weights provided a restriction means for restricting amount of movement of the weight within a predetermined range when the centrifugal force occurred.

Since the present invention is constructed as described above, in the region of low rotational speed, the aforementioned restriction means does not act and the abutting section of the input member and the output member is pressed by the centrifugal force acting on all of the centrifugal weights to produce relatively large friction force, therefore the shift-up can be performed easily even in the low speed region.

In a high speed region, centrifugal force of an appointed centrifugal weight among the plurality of the centrifugal weights does not act on the abutting section of the input member and the output member owing to the restriction means so that an appropriate friction force acts on the abutting section to enable an easy shift-down in the high speed region.

According to the present invention, since the centrifugal force of the appointed centrifugal weight is restricted so as not to act on the abutting section of the input and output members by means of the restriction means in the high speed region, the transmitted torque of the centrifugal friction clutch shows a performance character nearly proportional to the rotational speed so that shift-up and shift-down of the automatic speed changing device can be performed smoothly.

In the present invention, input side friction plates engage with the input member movably in the axial direction but unmovably in a rotational direction and output side friction plates engaging with the output member movably in the axial direction but unmovably in the rotational direction may be arranged alternately adjacent to each other, and the centrifugal weights may be arranged so as to abut against a group of the friction plates through the elastic member.

According to the construction, the transmitted torque of the centrifugal friction clutch can be changed properly in accordance with a change of the rotational speed and connection and disconnection of the centrifugal friction clutch can be performed appropriately and surely.

BRIEF DESCRIPTION OF THE DRAWINGS

FIG. 4 is a front view of an outer side plate section in FIG. 1;

DETAILED DESCRIPTION OF THE PREFERRED EMBODIMENT

Figure 1:
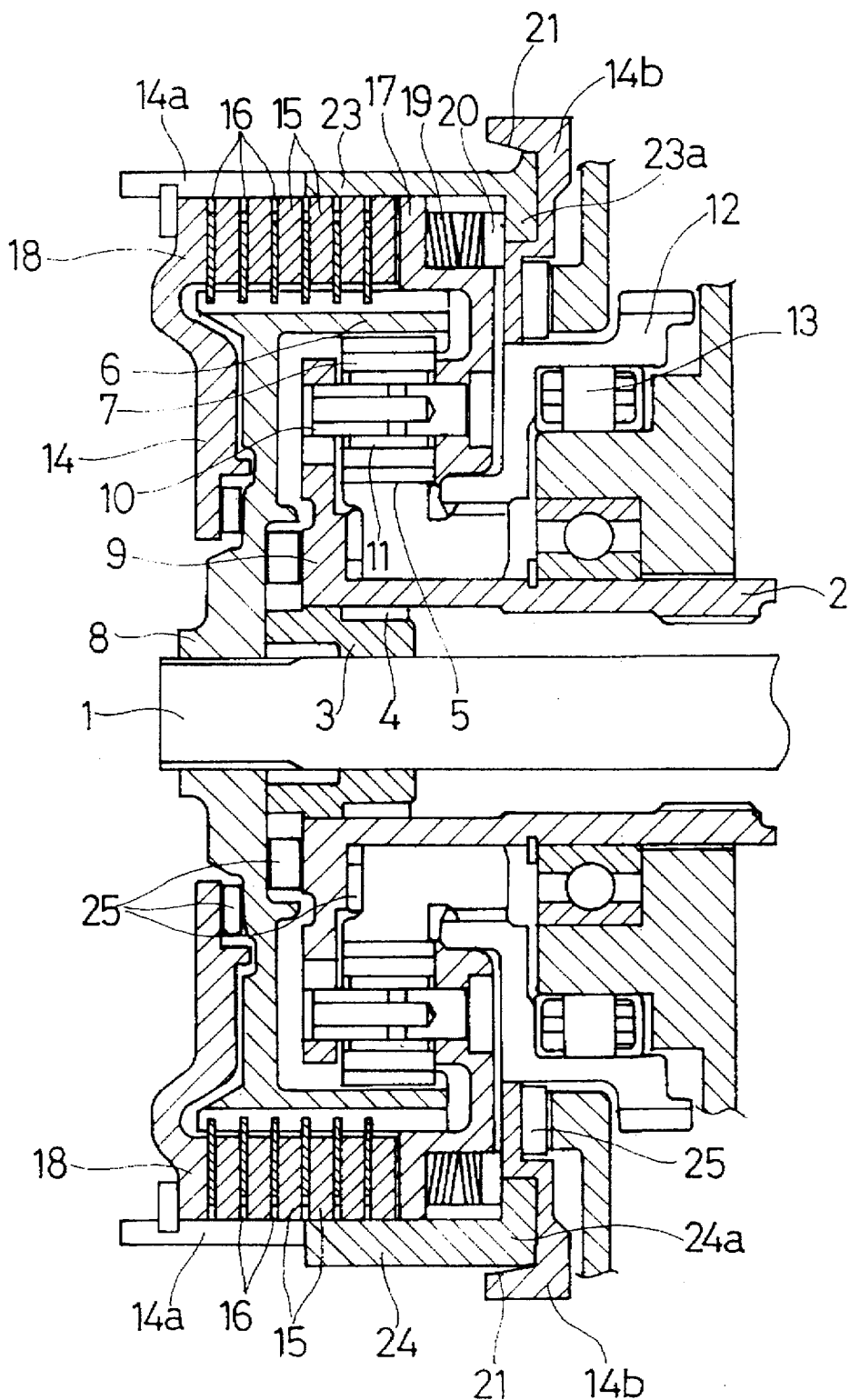
FIG. 1 is a view showing one embodiment of a centrifugal friction clutch for an automatic speed changing device according to the present invention in a stop condition and a sectional side view taken along the line III—III of FIG. 3.

Referring now to FIGS. 1 to 4, one preferred embodiment of the present invention applied to an automatic speed changing device for a motorcar will be described as follows.

An input shaft 1 is directly connected to a crankshaft of an internal combustion engine not shown and a tubular output shaft 2 is fitted on a boss section 3 fixed to an end of the input shaft rotatably through a roller bearing 4.

A sun gear 5 is fitted on a periphery of the output shaft 2 rotatably relative thereto, a disk section 8 of a ring gear 6 is integrally fitted to the input shaft 1 at the neighborhood of the boss section 3, three or four pieces of planetary gears 7 are arranged at regular intervals on the outer periphery of the sun gear 5, and the planetary gears 7 are engaged with the sun gear 5 and the ring gear 6. Shafts 10 are fitted to a planetary carrier 9 which is integrally connected with the tubular output shaft 2 and the planetary gears 7 are rotatably supported on the shafts 10 through needle bearings 11.

A rotary member 12 engaged with the sun gear 5 is provided with a one-way clutch 13 which allows the rotary member 12 to rotate in the same direction as the input shaft 1 but prevents it from rotation in the opposite direction.

On the outer peripheral surface of the ring gear 6 and the inner peripheral surface of an outer peripheral section 14a of a pressing member 14, respectively, are formed grooves or projections parallel with the axial direction at regular circumferential intervals, and annular input-side friction plates 15 and output-side friction plates 16 are engaged with the grooves or projections of the outer periphery of the ring gear 6 and inner periphery of the outer peripheral section 14a of the pressing member 14, respectively. The input-side and output-side friction plates 15, 16 are arranged neighboring with each other alternately.

The pressing member 14 can be moved finely in the axial direction in relation to the planetary carrier 9 element 18 is a pressing section of the pressing member 14. On an outer side face of a pressure receiving section 17 are arranged a plate spring 19 and a ring-shaped receiving piece 20.

As shown in FIG. 4, in an outer side plate section 14b of the pressing member 14 neighboring with the pressure receiving section 17 are formed rectangular cutouts 22 at regular intervals in the circumferential direction. In the cutouts 22 are fitted lighter centrifugal weights 23 and heavier centrifugal weights 24 alternately which have base portions 23a, 24b engaged with the ring-shaped receiving piece 20. The outer side plate section 14b has a taper section 21 on the inner surface of the outer periphery. The lighter centrifugal weight 23 does not abut against the taper section 21 of the outer side plate section 14b and can be swung for in the radial direction. However, the heavier centrifugal weight 24 is formed thick so that it abuts against the taper section 21 of the outer side plate section 14b to be prevented from swinging beyond a predetermined angle α.

The numerals 25 denote thrust bearings for the axial force.

Since the embodiment shown in FIGS. 1 to 4 is constructed as described above, in a state that the input shaft 1, namely the ring gear 6, rotates at a low speed, the planetary gears 6 rotate revolving round the sun gear 5 which is at a standstill in accordance with the rotation of the ring gear 6. According to the revolutions of the planetary gears 7, the planetary carrier 9 is rotationally driven at a speed changing ratio of 1+λ (λ=the number of teeth of the sun gear/the number of teeth of the ring gear), or Nc=Nr/1+λ when the rotational speed of the ring gear 6 is Nr.

Figure 8:
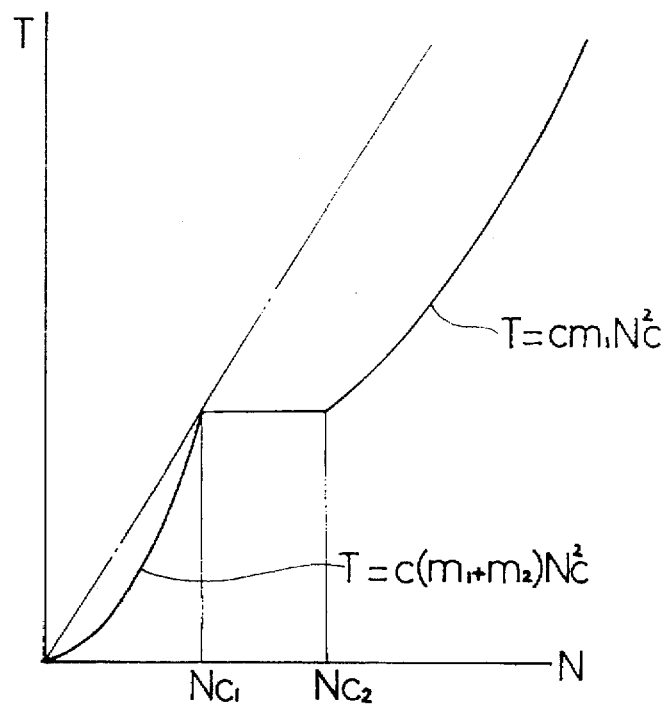
FIG. 8 is a transmitted torque character diagram of the embodiment shown in FIGS. 1 to 4.

According as the rotational speed of the input shaft 1, that is the rotational speed Nr of the ring gear 6, increases, the rotational speed Nc of the planetary carrier 9 also increases and centrifugal force X acting on the lighter and heavier centrifugal weights 23, 24, which is expressed by the formula $X=k(m_1+m_2)Nc^2$ ($m_1$: mass of the lighter centrifugal weight 23, $m_2$: mass of the heavier centrifugal weight), increases to compress the plate spring 19. As the result, the input-side friction plates 15 and the output-side friction plates 16 are pressed against each other to increase friction force and the transmitted torque $T=C(m_1+m_2)Nc^2$ increases relatively rapidly even in a low rotational speed region as shown in FIG. 8.

In this case, the planetary carrier 9 is given an acceleration torque by the friction between the input-side friction plate 15 and the output-side friction plate 16 and the sun gear 5 is also given a torque in the same direction as the ring gear 6 by the reaction. Since the one-way clutch 13 is constituted so as to allow a rotation of the sun gear 5 in the same direction as the ring gear 6, the planetary carrier 9 is accelerated so as to approach the rotational speed Nr of the ring gear 6 and the sun gear 5 is also rotationally driven to the same direction as the ring gear 6.

Figure 2:
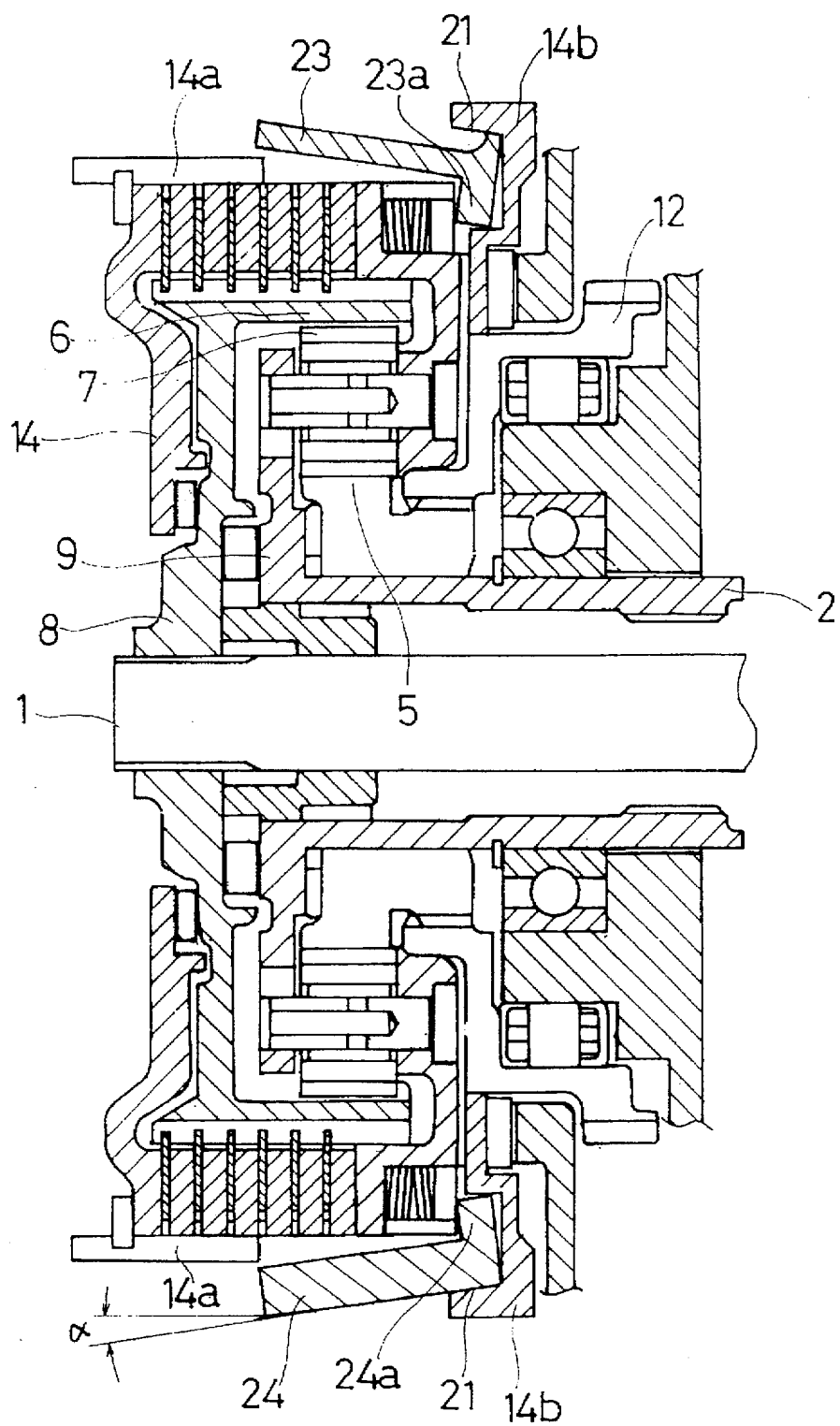
FIG. 2 is a sectional side view showing the centrifugal friction clutch of FIG. 1 in a low rotational speed condition.
Figure 3:
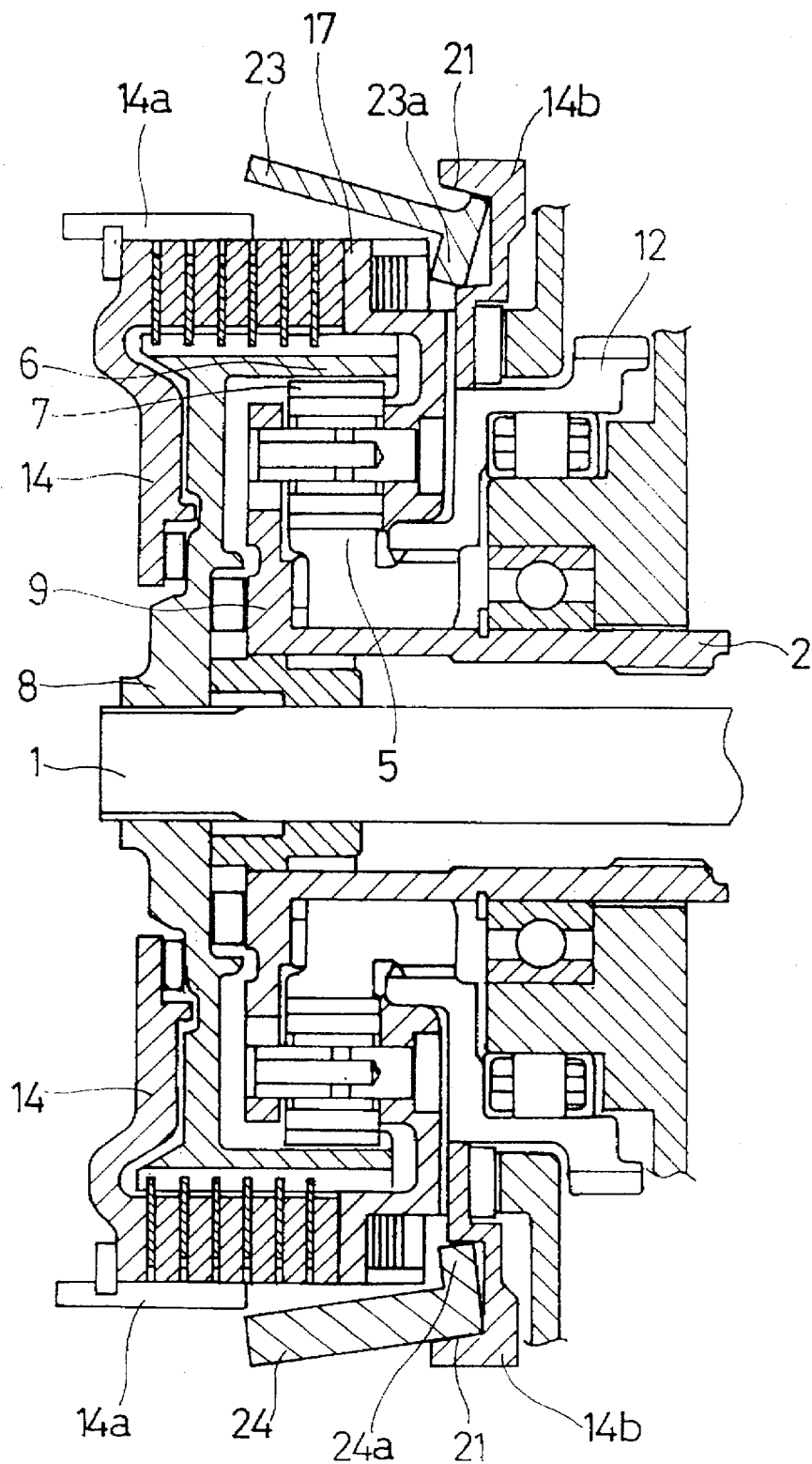
FIG. 3 is a sectional side view showing the centrifugal friction clutch of FIG. 1 in a high rotational speed condition.

When the rotational speed Nr of the ring gear 6 becomes $Nr_1$ equal to the rotational speed $Nc_1$ of the planetary carrier 9, the heavier centrifugal weight 24 abuts against the taper section 21 of the outer side plate section 14b of the pressing member 14, as shown in FIG. 2. In this state, the taper section 21 restricts swing of the heavier centrifugal weight 24 so that the heavier centrifugal weight 24 cannot swing further outward. Thereafter, until the rotational speed of the planetary carrier reaches a rotational speed $Nc_2$ at which the centrifugal force of the lighter centrifugal weight 23 only becomes equal to the centrifugal force K of both centrifugal weights 23, 24 at $Nc_1$ ($K=(m_1+m_2)Nc_1^2$), the transmitted torque T is kept about constant. Relation between $Nc_2$ and $Nc_1$ can be expressed by the following formula:

$$Nc_2^2=Nc_1^2(m_1+m_2)/m_1$$

When the rotational speed Nc of the planetary carrier 9 exceeds $Nc_2$, the transmitted torque becomes $Cm_1Nc^2$.

Figure 9:
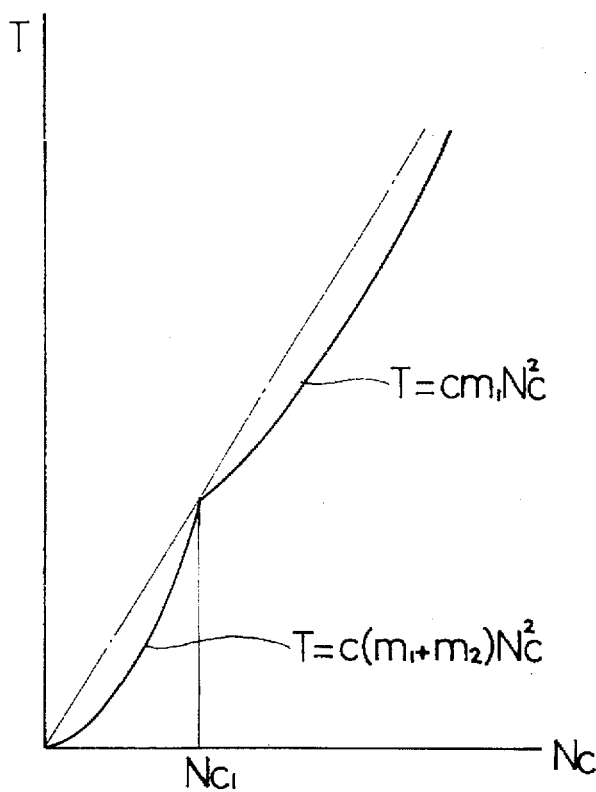
FIG. 9 is a transmitted torque character diagram of the embodiment shown in FIGS. 5 to 6.

However, if the moving amount of the ring-shaped receiving piece 20 by the lighter and heavier centrifugal weights 23, 24 at the time when the heavier centrifugal weight 24 abuts against the taper section 21 of the outer side plate section 14b is set to be the sum of the clutch clearance and the limit elastic deformation of the plate spring 19, $Nc_1$ and $Nc_2$ become equal to each other and the transmitted torque character of the friction clutch as shown in FIG. 9 is obtained.

Accordingly, when the input shaft accelerates from a low rotational speed region to a high rotational speed region, the planetary carrier 9 is directly connected with the ring gear 6 at a predetermined rotational speed higher than $Nr_1$ to smooth the shift-up. In one hand, when the input shaft decelerates from the high rotational speed region to the low rotational speed region, the direct connection of the planetary carrier 9 and the ring gear 6 is intercepted at a predetermined rotational speed, which is higher than $Nr_1$ but may be equal to or different from the shift-up rotational speed, to make the shift-down easy.

The embodiment shown in FIGS. 1 to 4 has two kinds of lighter and heavier centrifugal weights 23, 24, but if three or more kinds of centrifugal weights are used, a more linear transmitted torque character can be obtained.

Figure 5:
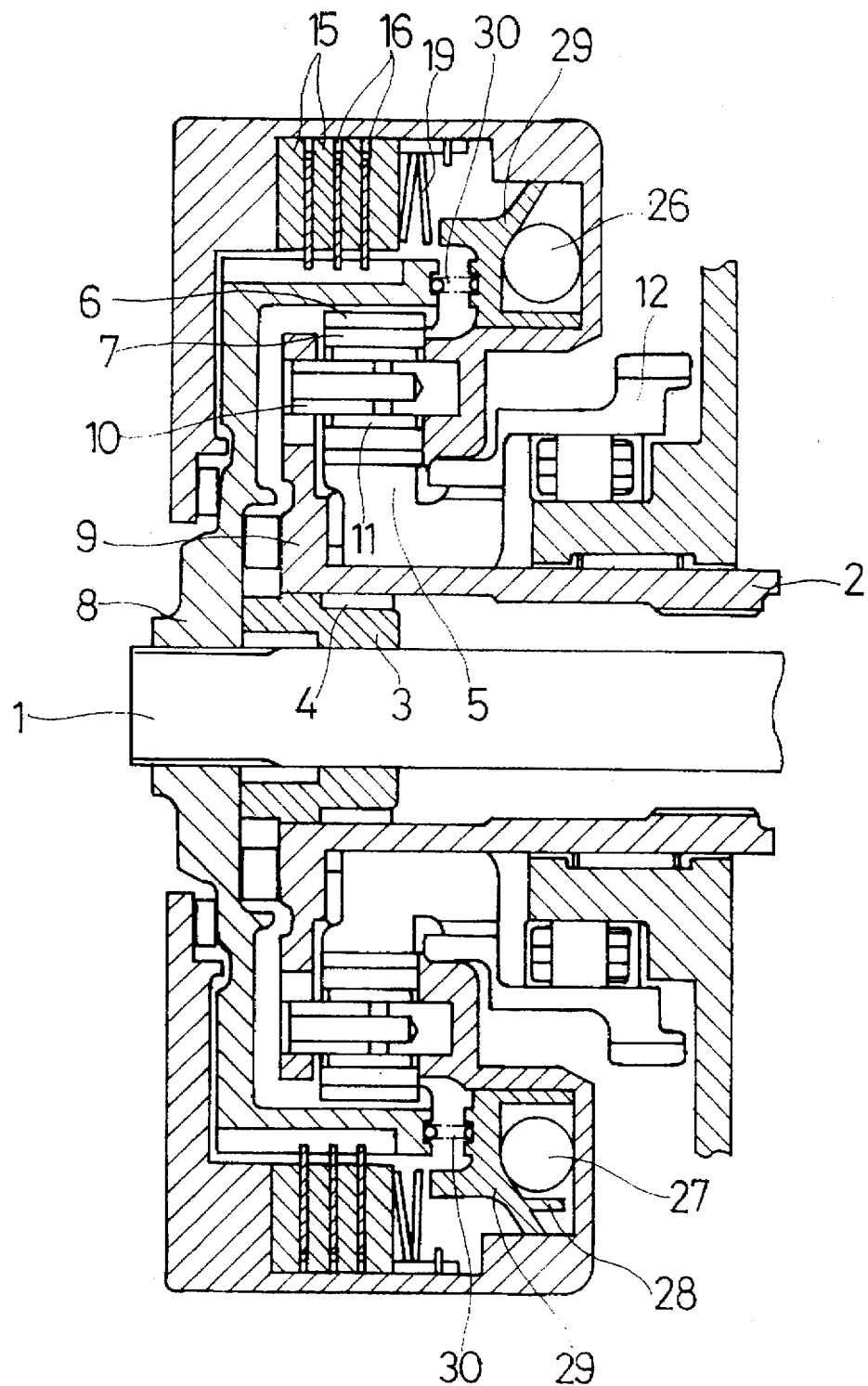
FIG. 5 is a sectional side view of the other embodiment of the present invention in a stop condition.
Figure 6:
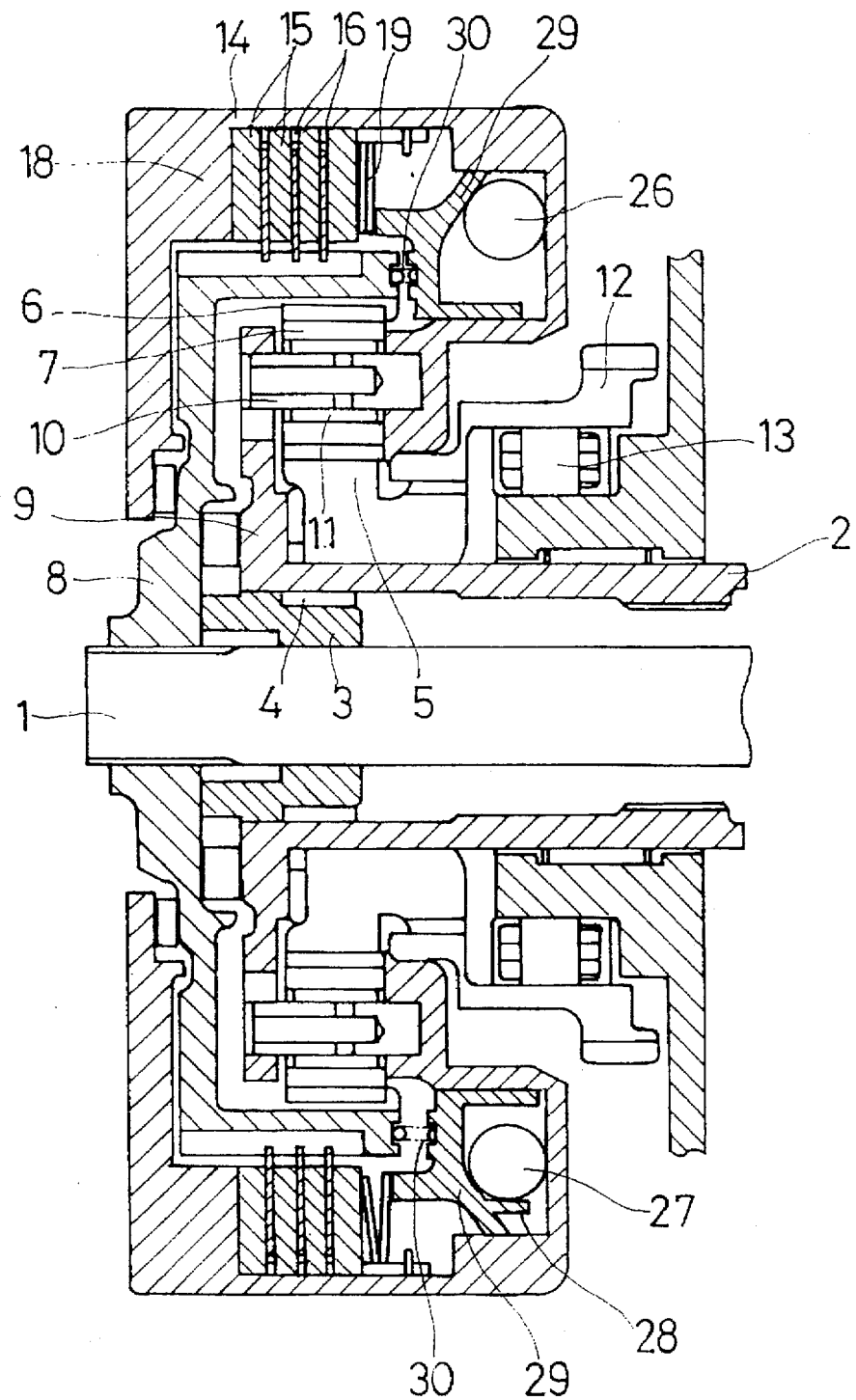
FIG. 6 is a sectional side view of the same embodiment in a high rotational speed condition.
Figure 7:
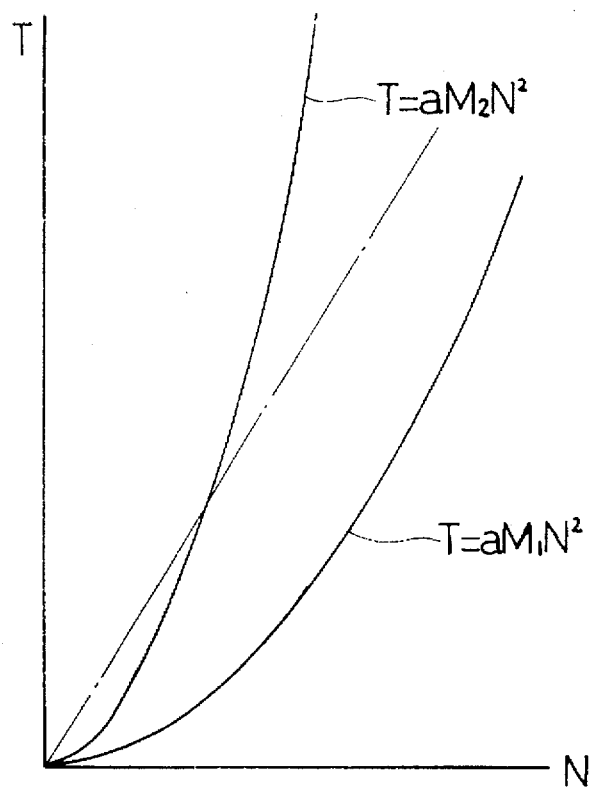
FIG. 7 is a transmitted torque character diagram of a centrifugal friction clutch.

In place of the two kinds of lighter and heavier centrifugal weights 23, 24 of the above-mentioned embodiment which are swingable, as shown in FIGS. 5 and 6, a plurality of spherical or cylindrical weights 26, 27 having equal weights may be used together with a stopper 28 for restricting amount of movement of the appointed weight 27.

Figure 10:
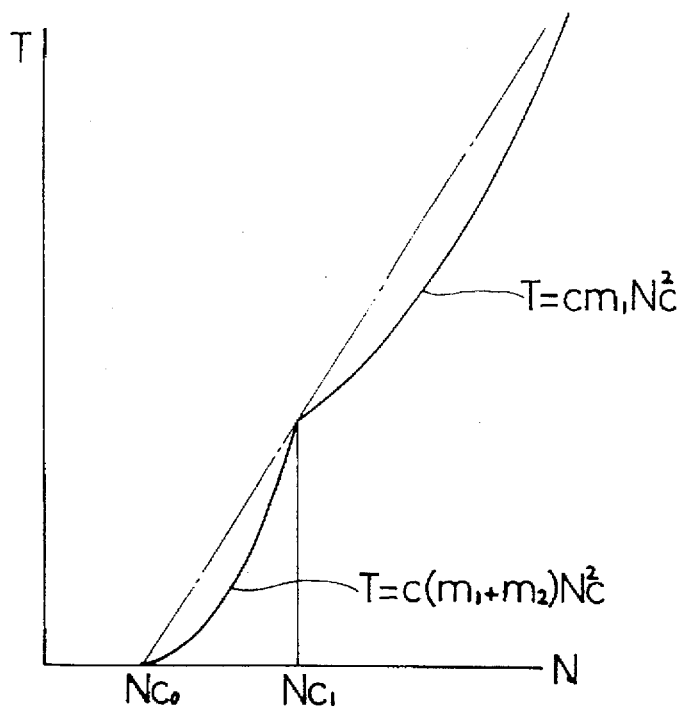
FIG. 10 is a transmitted torque character diagram of an embodiment having a centrifugal friction clutch constituted so that when a heavier centrifugal weight abuts against an outer side plate section, elastic deformation of a plate spring reaches a limit condition.

In the embodiment shown in FIGS. 5 and 6, until the rotational speed Nc of the planetary carrier 9 reaches $Nc_0$, the receiving piece 29 does not abuts against the plate spring 19 owing to spring force of a return spring 30 and the transmitted torque T is 0. If the rotational speed Nc of the planetary carrier exceeds $Nc_0$, the receiving piece 29 overcomes the spring force of the return spring 30 to abut against the plate spring 19 and the transmitted torque T begins to increase as shown in FIG. 10, then, when the rotational speed of the planetary carrier 9 exceeds $Nc_1$, only the centrifugal force of the cylindrical weight 26 acts and a nearly linear character is obtained in the same manner as the embodiment of FIGS. 1 to 4.

What is claimed is:

1. A centrifugal friction clutch for an automatic speed changing device comprising:

an input member;

a ring gear, having an outer peripheral surface, the ring gear being fixed on the input member;

a plurality of input friction plates fitted in grooves disposed in the outer peripheral surface of the ring gear;

a pressing member having an inner peripheral section and a plurality of rectangular cutouts spaced equally around the circumference of the pressing member;

a plurality of output friction plates, which are fitted in grooves disposed in the inner peripheral surface of the pressing member, wherein the output friction plates are disposed between the input friction plates;

lighter centrifugal weights and heavier centrifugal weights disposed swingably in the rectangular cutouts of the pressing member such that the lighter weights are between the heavier weights circumferentially;

an output member with a sun gear fitted on a periphery of the output member;

a planetary carrier having a plurality of planetary gears arranged at regular intervals on an outer periphery of the carrier and supported rotatably thereon, wherein the planetary gears are also positioned on an outer periphery of the sun gear and an inner periphery of the ring gear and engaged with the sun gear and ring gear;

a pressure receiving section disposed adjacent to the input and output friction plates;

a spring disposed adjacent to the pressure receiving section such that, as the pressing member increases in angular velocity, the lighter and heavier weights swing radially outward so as to apply pressure to the pressure receiving section through the spring and increase the coupling between the pressing member and the ring gear;

a taper section disposed on the pressing member adjacent to the heavier centrifugal weights which prevents the heavier centrifugal weights from swinging beyond a predetermined angle.

2. A centrifugal friction clutch for an automatic speed changing device as in claim 1 wherein a torque transmitted from the input member to the output member is substantially constant for speeds of the planetary carrier which range from a point when the heavier centrifugal weight is prevented from swinging, when the speed of the carrier is designated $N_{c1}$, to a point where the rotational speed of the planetary carrier is $N_{c2}$, where $N_{c2}$ is defined to be $(N_{c2})^2=(N_{c1})^2(m_1+m_2)/m_1$, and $m_1$ and $m_2$ are the masses of the lighter and heavier centrifugal weights, respectively.

* * * * *